United States Patent
Sato (10) Patent No.: US 10,095,170 B1
(45) Date of Patent: Oct. 9, 2018

(54) DECOLORING DEVICE AND IMAGE PROCESSING SYSTEM

(71) Applicants: KABUSHIKI KAISHA TOSHIBA, Tokyo (JP); TOSHIBA TEC KABUSHIKI KAISHA, Tokyo (JP)

(72) Inventor: Naoya Sato, Atami Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/886,087

(22) Filed: Feb. 1, 2018

(30) Foreign Application Priority Data

Aug. 22, 2017 (JP) .................................. 2017-159533

(51) Int. Cl.
| | |
|---|---|
| G03G 15/00 | (2006.01) |
| H04N 1/12 | (2006.01) |
| H04N 1/00 | (2006.01) |
| G06K 9/00 | (2006.01) |
| H04N 1/21 | (2006.01) |

(52) U.S. Cl.
CPC ..... *G03G 15/5025* (2013.01); *G06K 9/00469* (2013.01); *H04N 1/00408* (2013.01); *H04N 1/1215* (2013.01); *H04N 1/21* (2013.01); *G06K 2209/01* (2013.01)

(58) Field of Classification Search
CPC ............. G03G 15/5025; H04N 1/1215; H04N 1/00408; H04N 1/21; G06K 2209/01; G06K 9/00469
See application file for complete search history.

(56) References Cited

U.S. PATENT DOCUMENTS

| | | | | |
|---|---|---|---|---|
| 9,075,348 | B2* | 7/2015 | Kaneko | .................... B41J 29/38 |
| 2012/0038958 | A1* | 2/2012 | Iguchi | .................... G03G 21/00 |
| | | | | 358/505 |
| 2012/0306985 | A1 | 12/2012 | Iguchi et al. | |

FOREIGN PATENT DOCUMENTS

JP          2015179220 A          10/2015

* cited by examiner

*Primary Examiner* — Hoang Ngo
(74) *Attorney, Agent, or Firm* — Patterson & Sheridan, LLP (57) ABSTRACT

A decoloring device includes a scanner, a decoloring unit, and a processor. The scanner reads an image on a sheet. The decoloring unit decolors the image on the sheet after the scanner has read the image. The processor recognizes a page number included in the image and stores the image read by the scanner and decolored by the decoloring unit at a location that is associated with the recognized page number.

16 Claims, 6 Drawing Sheets

| PAGE NUMBER | FILE NAME |
|---|---|
| 33 | 0001.jpg |
| 32 | 0002.jpg |
| 35 | 0003.jpg |

FIG. 9

| PAGE NUMBER | FILE NAME |
|---|---|
| 32 | 0002.jpg |
| 33 | 0001.jpg |
| 35 | 0003.jpg |

DECOLORING DEVICE AND IMAGE PROCESSING SYSTEM

CROSS-REFERENCE TO RELATED APPLICATION

This application is based upon and claims the benefit of priority from Japanese Patent Application No. 2017-159533, filed Aug. 22, 2017, the entire contents of which are incorporated herein by reference.

FIELD

An embodiment described herein relates to a decoloring device and an image processing system.

BACKGROUND

In recent years, an image forming device that forms images on a sheet with a decolorable image forming material is known. A decoloring device that decolors images formed of the decolorable image forming material on the sheet by such an image forming device is also known. Some decoloring devices in the related art have a function of reading images to be decolored on the sheet before decoloring the images. However, even when the decoloring device in the related art has a function of saving the images read from the sheet before decoloring, such decoloring device just saves the read images. For example, the decoloring device sometimes performs decoloring processing on a plurality of sheets that are collectively stacked by a user. In such an operation, in many cases, the user stacks a plurality of sheets in any order. In such a case, the decoloring device saves images read from a plurality of sheets in the stacked order. Therefore, even if it is attempted to utilize the images read from the stacked sheets before decoloring, there is a case where it is difficult to utilize the saved images because the saved images may be in any order.

DETAILED DESCRIPTION

In order to solve the above problem, there are provided a decoloring device and an image processing system capable of easily utilizing images read from a plurality of sheets.

In general, according to an embodiment, a decoloring device includes a scanner, a decoloring unit, and a processor. The scanner reads an image on a sheet. The decoloring unit decolors the image formed on a sheet after the scanner has read the image. The processor recognizes a page number included in the image and stores the image read by the scanner and decolored by the decoloring unit at a location that is associated with the recognized page number.

Figure 1:
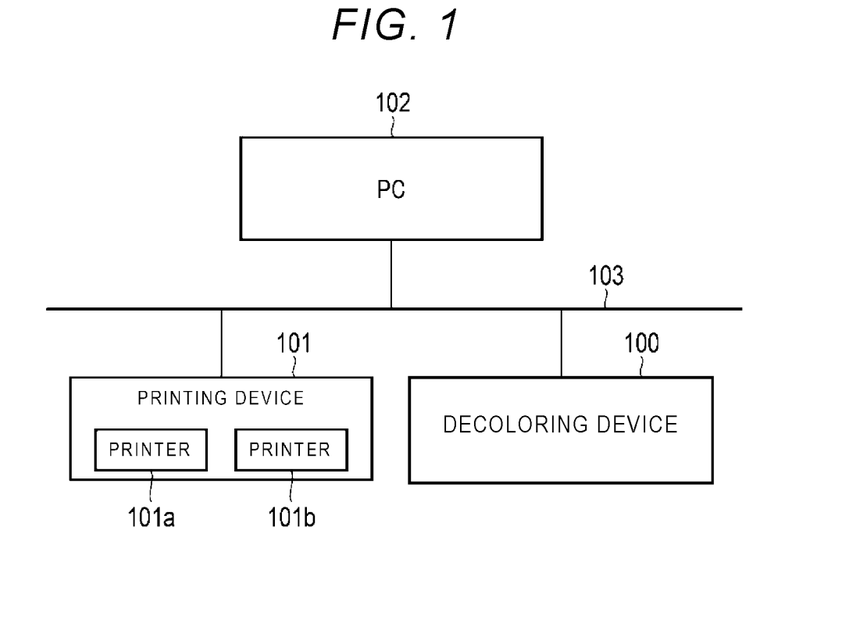
FIG. 1 is a diagram showing a system configuration example of an image processing system according to an embodiment.

Hereinafter, an embodiment will be described with reference to drawings. First, a configuration of an image processing system including a decoloring device according to an embodiment will be described. FIG. 1 is a diagram showing a configuration example of the image processing system including the decoloring device according to the embodiment. In the configuration example shown in FIG. 1, the image processing system includes a decoloring device 100, a printing device 101, and a personal computer (PC) 102. In addition, components such as the decoloring device 100, the printing device 101, and the PC 102 are connected via a network 103 such as a LAN. In addition, the decoloring device 100 and the printing device 101 may be integrally provided.

The PC 102 is an information processing device that communicates with the decoloring device 100 and the printing device 101 via the network 103. The PC 102 is, for example, a general-purpose computer. Instead of including the PC 102, a cloud service such as SSaaS, PaaS, IaaS or the like can be used for storing images read from a sheet of recording medium, e.g., paper, before decoloring. The decoloring device 100 decolors images formed on the sheet with an image forming material such as decolorable toner or decolorable ink. The decoloring device 100 includes a function of reading images on the sheet before decoloring processing.

The printing device 101 is a device that prints images on a sheet of paper as a recording medium. The printing device 101 prints images on the sheet in response to a print request from the PC 102 or the decoloring device 100, for example. It is assumed that the printing device 101 includes a printer 101a that forms images on the sheet with the decolorable image forming material and a printer 101b that forms images on the sheet with a non-decolorable image forming material. In addition, the printing device 101 may include either one of the printer 101a or the printer 101b.

In addition, the printer 101a and the printer 101b of the printing device 101 may be printers of any image forming system. For example, the printer 101a of the printing device 101 may be an electrophotographic printer using decolorable toner. In addition, the printer 101a of the printing device 101 may be an inkjet printer using decolorable ink. In the embodiment described below, it is assumed and described that the printing device 101 includes the electrophotographic printer 101a that forms images with decolorable toner and the electrophotographic printer 101b that forms images with non-decolorable toner.

Figure 2:
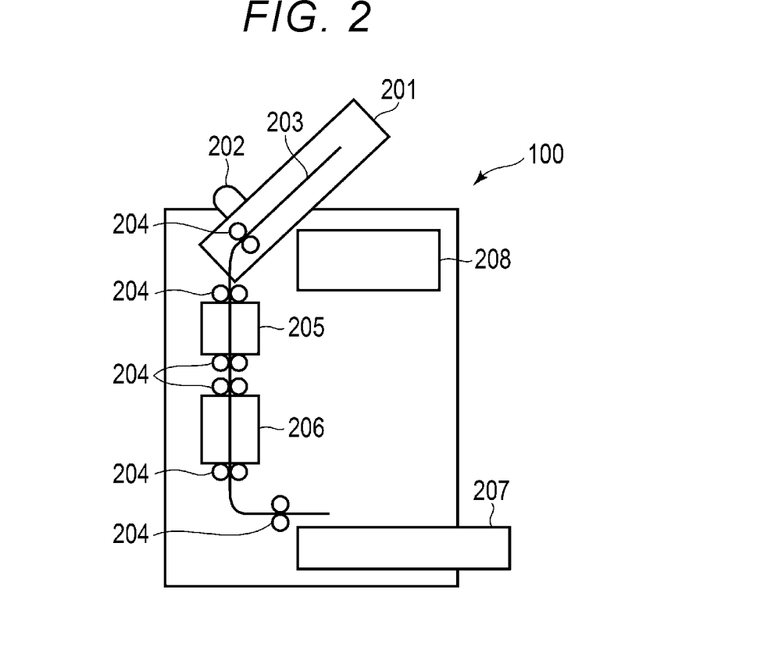
FIG. 2 is a diagram showing an internal configuration example of the decoloring device according to the embodiment.

Next, a hardware configuration of the decoloring device 100 according to the embodiment will be described. FIG. 2 is a cross-sectional view schematically showing a configuration example of the decoloring device 100 according to the embodiment. The decoloring device 100 includes a paper feed unit 201, a sensor 202, a carrying path 203, carrying rollers 204, a reading unit (e.g., a scanner) 205, a decoloring unit 206, a paper discharge unit 207, and an operation panel 208.

The paper feed unit 201 feeds an uppermost sheet of stacked papers, one by one, into the decoloring device 100. The paper feed unit 201 includes a paper feed tray (not shown) and a pickup roller (not shown). The paper feed tray holds a stack of sheets of paper to be decolored. The pickup roller takes out the sheets one by one from the paper feed tray and sends the sheet out to the carrying path 203. For example, in the present embodiment, it is assumed that the stack of sheets of paper make up one document and are stacked in any order (i.e., the pages of the document may be out of order) on the paper feed tray. Further, in the present embodiment, it is assumed that a corresponding page number is printed on each sheet to be read.

The sensor 202 configured to detect a sheet is provided in the paper feed unit 201. The sensor 202 detects the sheet placed on the paper feed tray of the paper feed unit 201. The carrying path 203 is formed by a plurality of carrying rollers 204. Each of the carrying rollers 204 includes a pair of a driving roller and a driven roller. The carrying path 203 is a path for carrying the sheet from the paper feed unit 201 to the paper discharge unit 207 through the reading unit 205 and the decoloring unit 206.

The reading unit 205 reads the images on the sheet carried by the carrying path 203. The reading unit 205 includes a photoelectric conversion element such as a CCD sensor or a CMOS sensor and a scanner including an optical system for guiding light from the sheet to the photoelectric conversion element. In addition, the reading unit 205 may include a first scanner that reads images on the first side of the sheet and a second scanner that reads images on a second side (the side opposite the first side) of the sheet. The images read by the reading unit 205 are saved in the memory in the PC 102 or the decoloring device 100.

The decoloring unit 206 includes a heater, a roller pair, and the like. The heater supplies the heat to decolor images formed with the decolorable image forming material on the sheet. The roller pair is heated by the heater. The roller pair heated by the heater applies heat of a predetermined temperature, at which an image formed with the decolorable image forming material is decolored, to the sheet being carried. The decolorable image forming material on the sheet is made colorless by being heated at a temperature equal to or higher than the predetermined temperature. That is, the decoloring unit 206 decolors the images formed on the sheet by applying heat to the sheet via the pair of rollers heated by the heater.

In the paper discharge unit 207, the sheet decolored after image reading is discharged. The operation panel 208 is a user interface. The operation panel 208 includes, for example, a display device that displays a message to the user and an operation device that receives operation instructions from the user. A configuration example of the operation panel 208 will be described later.

Figure 3:
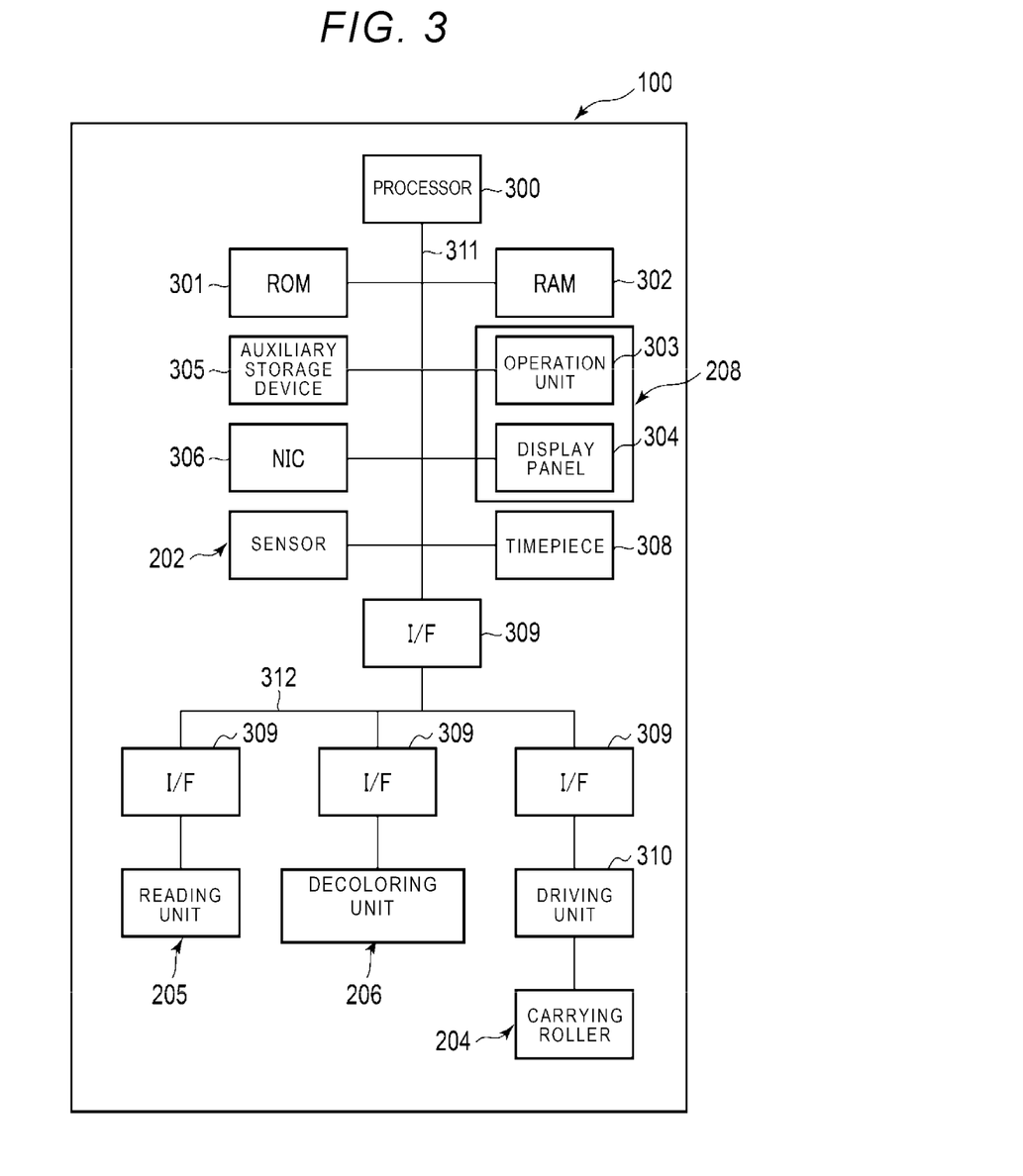
FIG. 3 is a block diagram showing a configuration example of a control system in a decoloring device according to the embodiment.

Next, a configuration of a control system of the decoloring device 100 according to the embodiment will be described. FIG. 3 is a block diagram showing a configuration example of the control system of the decoloring device 100 according to the embodiment. As shown in FIG. 3, the decoloring device 100 includes a processor 300 that executes various kinds of control and processing by executing a program. In the decoloring device 100, the processor 300 is connected via a system bus 311 to a ROM 301, a RAM 302, an operation unit 303, a display unit 304, an auxiliary storage device 305, a network interface card (NIC) 306, the sensor 202, a clock 308, an interface (I/F) 309. Further, the processor 300 is connected to a driving unit 310 for the carrying roller 204, the decoloring unit 206, and the carrying roller 204 via the I/F 309.

The processor 300 is, for example, a central processing unit (CPU). The processor 300 executes various kinds of control and processing by executing a program stored in a memory such as the ROM 301 or the auxiliary storage device 305. In addition, the processor 300 has a function capable of executing processing equivalent to that of the PC 102. Therefore, the processing by the PC 102 to be described later may be performed by the processor 300 of the decoloring device 100.

A read-only memory (ROM) 301 is a rewritable nonvolatile memory. The ROM 301 stores, for example, a program to be executed by the processor. A random access memory (RAM) 302 temporarily holds data. For example, the RAM 302 is used as a working memory when the processor 300 executes a program. In addition, the RAM 302 may function as a buffer memory that temporarily holds data such as communication data.

The operation unit 303 is an operation device for a user to input information. The operation unit 303 includes, for example, operation buttons, a touch panel, a keyboard, and the like. In the operation panel 208, the display unit 304 is a display device that displays information. The display unit 304 includes, for example, a liquid crystal display, an organic EL display or the like. The operation unit 303 and the display unit 304 are mounted on an upper portion of the decoloring device 100. For example, the operation unit 303 and the display unit 304 may be integrally provided as a touch panel display.

The auxiliary storage device 305 includes a storage device that stores information. The auxiliary storage device 305 includes, e.g., a rewritable nonvolatile memory. The auxiliary storage device 305 may be any of storage devices such as a hard disk drive (HDD), a solid-state drive (SSD), for example. The auxiliary storage device 305 may be provided with a storage area for storing image data read by the reading unit 205 and management information of image data and the like. In addition, the auxiliary storage device 305 may store a program to be executed by the processor.

The NIC 306 is a communication interface. In the present embodiment, the NIC 306 realizes the function of communicating with the printing device 101 or the PC 102 via the network 103. The sensor 202 outputs a signal indicating the presence or absence of the sheet on the paper feed tray of the paper feed unit 201. Based on the signal from the sensor 202, the processor 300 determines whether or not the sheet is present on the paper feed tray of the paper feed unit 201. The clock 308 includes a timepiece that tracks the current date and time and a timer that measures elapsed time.

The I/F 309 and the communication cable 312 are used for transmitting and receiving signals between the processor 300 and each unit. That is, the processor 300 communicates with the reading unit 205, the decoloring unit 206, and the driving unit 310 for the carrying roller 204 via the I/F 309 and the communication cable 312. For example, the reading unit 205 is connected to the processor 300 via the interface 309, the communication cable 312 and the system bus 311. The processor 300 transmits control information such as an operation instruction to the reading unit 205 and acquires information such as a read image from the reading unit 205.

In addition, the decoloring unit 206 is connected to the processor 300 via the interface 309 and the communication cable 312. The processor 300 supplies control information such as an operation instruction to the decoloring unit 206 and acquires information from the decoloring unit 206. The processor 300 performs temperature control for decoloring the images on the sheet with respect to the heater of the decoloring unit 206.

In addition, the driving unit 310 includes a motor and a control device that controls driving of a mode and the like. The carrying roller 204 and the driving unit 310 are connected by members of a drive system such as a gear and a shaft. The carrying roller 204 rotates with the power from the motor of the driving part 310. The processor 300 controls the carrying of the sheet by the carrying roller 204 by driving the motor of the driving unit 310 connected via the I/F 309.

Figure 4:
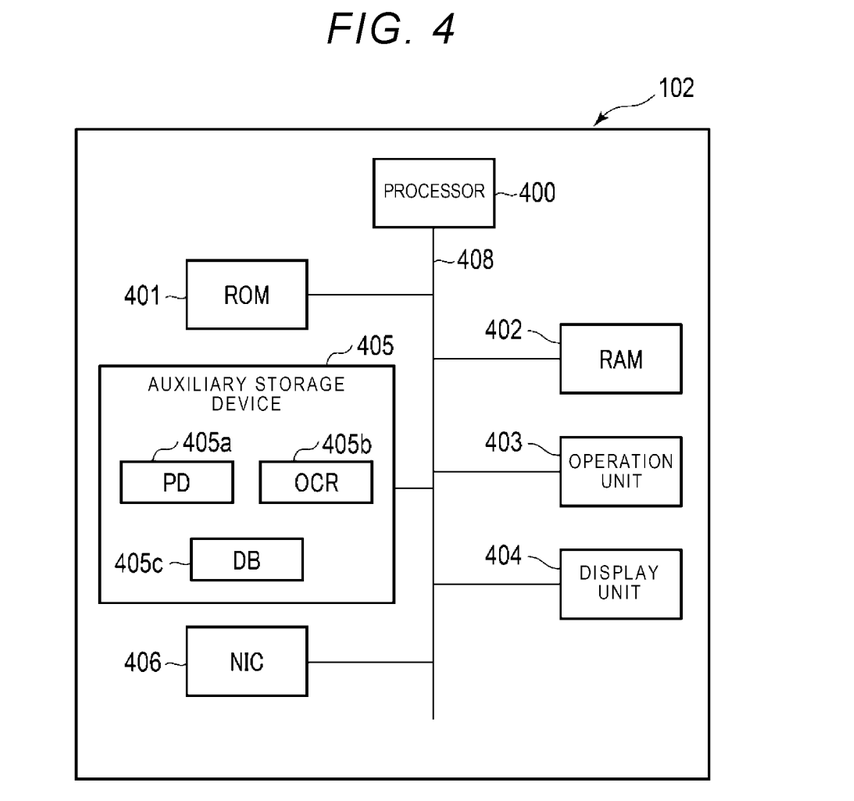
FIG. 4 is a block diagram showing a configuration example of the control system in a PC according to the embodiment.

Next, a configuration of a control system of the PC 102 according to the embodiment will be described. FIG. 4 is a block diagram showing the configuration example of the control system of the PC 102 according to the embodiment. The PC 102 includes a processor 400, a ROM 401, a RAM 402, an operation unit 403, a display unit 404, an auxiliary storage device 405, and an I/F 406. The processor 400, which is a control unit of the PC 102, is connected to the ROM 401, the RAM 402, the operation unit 403, the display unit 404, the auxiliary storage device 405, and the I/F 406 via a system bus 408.

The processor 400 realizes control of each unit and various kinds of processing by executing a program. The processor 400 is, for example, a central processing unit (CPU). The processor 400 executes a program stored in a memory such as the ROM 401 or the auxiliary storage device 405 to carry out control of each unit and various kinds of processing. The read-only memory (ROM) 401 is a rewritable nonvolatile memory. The ROM 401 stores, for example, a program to be executed by the processor. The random access memory (RAM) 402 temporarily holds data. For example, the RAM 402 is used as a working memory when the processor 400 executes a program. In addition, the RAM 402 may function as a buffer memory that temporarily holds data such as communication data.

The operation unit 403 is an operation device through which a user inputs information. The operation unit 403 includes a keyboard, a touch panel, a pointing device, and the like. The display unit 404 is a display device that displays information. The display unit 404 includes, for example, a liquid crystal display or an organic EL display. The operation unit 403 and the display unit 404 may include a display device with a touch panel.

The auxiliary storage device 405 includes a storage device for storing information. The auxiliary storage device 405 includes, e.g., a rewritable nonvolatile memory. The auxiliary storage device 405 may be any of various storage devices such as a hard disk drive (HDD), a solid-state drive (SSD), for example. For example, the auxiliary storage device 405 stores a program for the processor 400 to execute processing to be described later. In addition, the auxiliary storage device 405 stores image data as read images read by the reading unit 205 of the decoloring device 100 and management information on image data and the like.

In the example shown in FIG. 4, the auxiliary storage device 405 stores a print control program (printer driver (PD)) 405a, a recognition program (OCR) 405b, and a database (DB) 405c. The printer driver 405a is a program for controlling printing by the printing device 101. For example, the processor 400 issues a print request to the printing device 101 by executing the printer driver 405a. For example, by executing the printer driver 405a, the processor 400 may specify printing with the printer 101b of the printing device 101.

In addition, the recognition program 405b is a program for recognizing page numbers in the images by using OCR processing technique. For example, the processor 400 recognizes the page numbers in the images by executing the recognition program 405b. In addition, the database (DB) 405c holds management information for managing images. For example, the processor 400 stores images read by the reading unit 205 of the decoloring device 100 and records associated with the page numbers recognized from the images in the database 405c. It is assumed that the database 405c stores management information (e.g., in the form of a management table) generated for each series of images decolored by the decoloring device 100.

The print control program, the recognition program, and the database may be stored in the auxiliary storage device 305 of the decoloring device 100. In this case, the processor 300 of the decoloring device 100 may execute the print control program and recognition program, and the management information including the processing result may be stored in the auxiliary storage device 305.

The NIC 406 is a communication interface. The NIC 406 of the PC 102 is an interface that communicates with the decoloring device 100 and the printing device 101 via the network 103. The processor 400 may realize communication processing with the decoloring device 100 and the printing device 101 by using the NIC 406.

Next, sort processing in the image processing system according to the present embodiment will be described. Here, the process of saving the images read from the sheets which are subjected to the decoloring processing by the decoloring device 100 and sorting the saved images based on the order of the page numbers is called sort processing. In addition, in the operation example described below, printing by the printing device 101 of the sheets in the order in which each image read by the decoloring device 100 has been sorted by sorting processing will be described.

Figure 5:
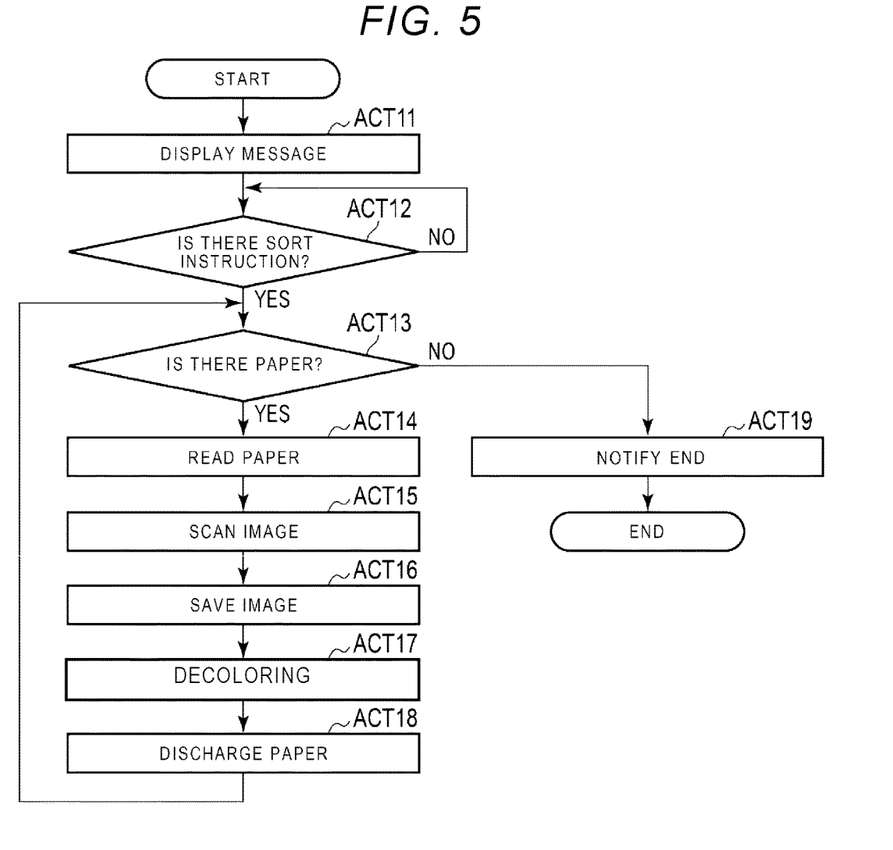
FIG. 5 is a flowchart for explaining an operation example of the decoloring device according to the embodiment.
Figure 6:
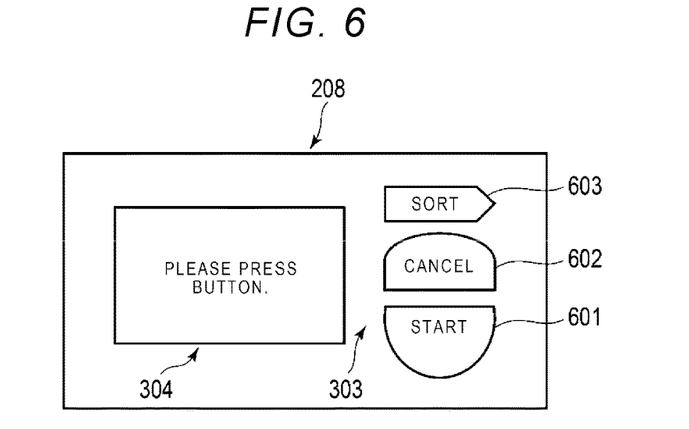
FIG. 6 is a diagram showing a configuration example of an operation panel in the decoloring device according to the embodiment.

FIG. 5 is a flowchart for explaining an operation example of the decoloring device 100 in the sort processing. The processor 300 of the decoloring device 100 displays a start message on the display unit 304 of the operation panel 208 in a standby state in which decoloring processing may be executed (ACT 11). FIG. 6 is an external view showing a configuration example of the operation panel 208. As shown in FIG. 6, the operation panel 208 includes the display unit 304 and the operation unit 303. In the example shown in FIG. 6, the operation unit 303 includes a start button 601, a cancel button 602, and a sort button 603. In addition, in the example shown in FIG. 6, the display unit 304 displays a start message "Please press a button". Each of the buttons 601, 602, and 603 may be provided as an icon that may be selected by a touch panel as the operation unit 303 provided on the display screen of the display unit 304.

When the start button 601 is pressed in the operation panel 208 shown in FIG. 6, the processor 300 starts decoloring processing. When the sort button 603 is pressed, the processor 300 executes decoloring processing including sort processing. The cancel button 602 is a button for instructing to cancel the processing while the decoloring process is being executed. When the sort button 603 is pressed, the contents of the sort processing may be specified. For example, as the sort button, there may be provided buttons for instructing processing of printing images sorted according to the page order and buttons for instructing processing of saving images sorted according to the page order. In addition, in a case where printing images sorted according to the page order, it may be possible to specify whether an image is printed with the non-decolorable image forming material or a decolorable image forming material.

When the sort button 603 is pressed (ACT 12, YES), the processor 300 checks whether there is a sheet in the paper feed unit 201 (ACT 13). The processor 300 determines the presence or absence of the sheet by checking the detection signal of the sensor 202. When it is determined that there is a sheet in the paper feed unit 201 (ACT 13, YES), the processor 300 feeds one sheet of paper from the paper feed unit 201 (ACT 14). When the paper feed unit 201 feeds the sheet, the processor 300 carries the sheet to the reading unit 205 by the carrying roller 204. When the sheet reaches the reading unit 205, the processor 300 reads the images formed on the sheet fed by the reading unit 205 (ACT 15).

When the reading unit 205 reads the images on the sheet, the processor 300 performs processing of saving the read images read by the reading unit 205 (ACT 16). Here, it is assumed that the processor 300 saves the image data of the images read by the reading unit 205 in the PC 102. That is, the processor 300 transmits the image data from the reading unit 205 to the PC 102 via the LAN 103 by the NIC 306. On the other hand, the PC 102 receives the image data from the decoloring device 100 by the NIC 406, and saves the received image data in the auxiliary storage device 405. Communication between the NIC 306 of the decoloring device 100 and the NIC 406 of the PC 102 may be carried out according to a protocol such as Server Message Block (hereinafter, referred to as "SMB") or Secure Shell (hereinafter, referred to as "SSH") using TCP/IP communication.

In addition, the processor 300 carries the sheet passed through the reading unit 205 to the decoloring unit 206 and executes decoloring processing on the sheet (ACT 17). The processor 300 decolors the images on the sheet by applying heat of a predetermined decoloring temperature to the sheet from the heater of the decoloring unit 206. When the sheet decoloring processing is completed (the sheet passes through the decoloring unit 206), the processor 300 discharges the sheet to the paper discharge unit 207 (ACT 18).

The processor 300 executes the processing of ACTs 14 to 18 on each sheet of paper set in the paper feed unit 201. That is, while there is a sheet in the paper feed unit 201, the processor 300 repeatedly executes the processing of ACTs 14 to 18 for each sheet. That is, when the document to be read by the reading unit 205 includes a plurality of pages, each page of the document is separately read and the each read image data corresponding to the each page is saved into the auxiliary storage device 405. In addition, when it is determined that there is no sheet in the paper feed unit 201 (ACT 13, NO), the processor 300 notifies the PC 102 of the end of the series of processing (decoloring processing) (ACT 19) and ends the processing in the decoloring device 100.

Figure 7:
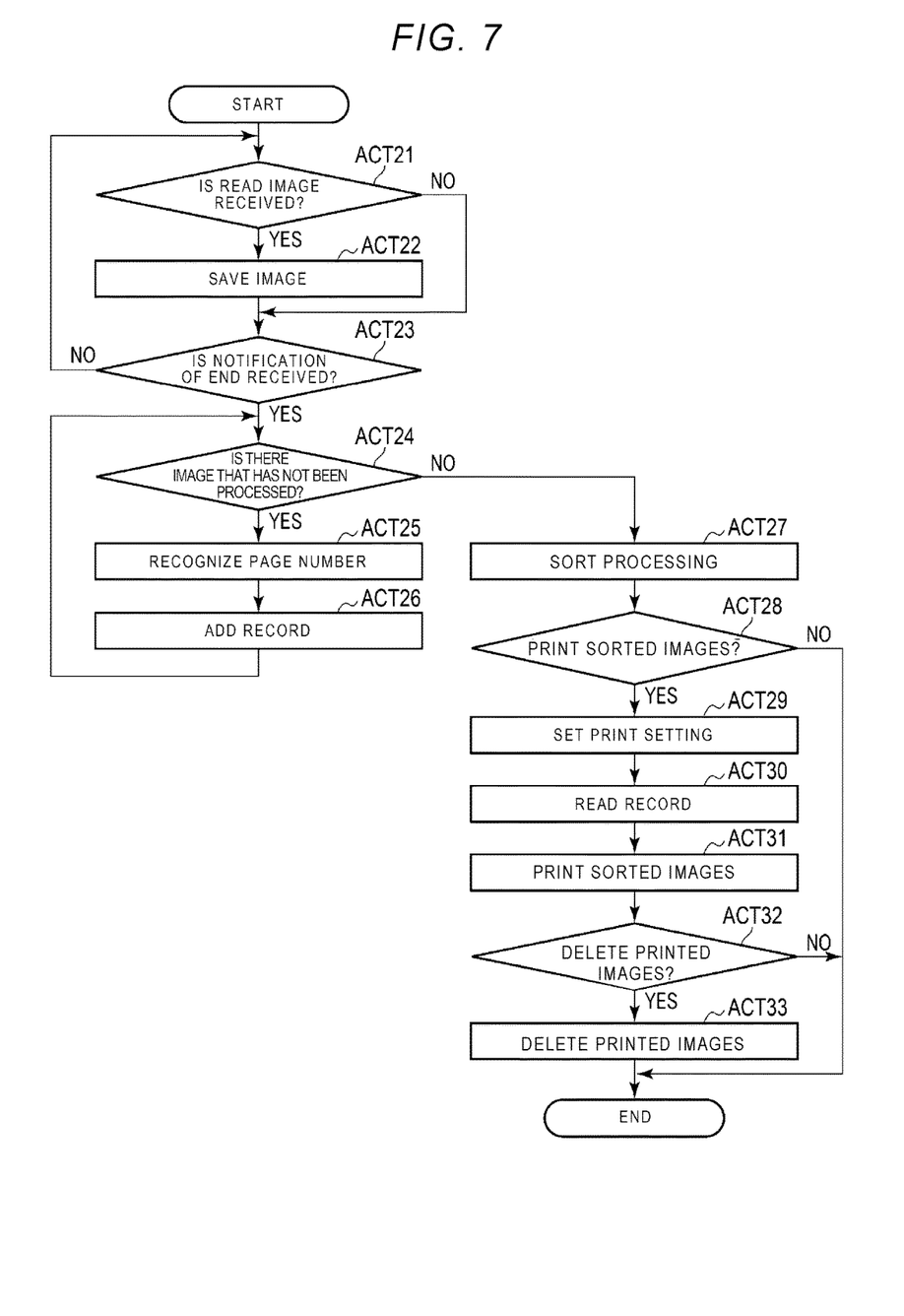
FIG. 7 is a flowchart for explaining an operation example of the PC according to the embodiment.

Next, the operation of the PC 102 in the image processing system according to the present embodiment will be described. FIG. 7 is a flowchart for explaining an operation example of the PC 102 in the sort processing. The processor 400 of the PC 102 may communicate with the decoloring device 100 via the LAN 103 by the NIC 406. In the standby state, the processor 400 accepts image data of read images read from the sheet before decoloring from the decoloring device 100 with which the processor 400 can communicate by the NIC 406 (ACT 21).

When receiving the image data of the read images from the decoloring device 100 before decoloring (ACT 21, YES), the processor 400 saves the received image data in the auxiliary storage device 405 (ACT 22). The processor 400 stores the received image data in the auxiliary storage device 405 as individual image files. When the received image data is saved in the auxiliary storage device 405, the processor 400 receives a notification of the next image data or the end of a series of processing.

When receiving the notification of the end of processing from the decoloring device 100 (ACT 23, YES), the processor 400 performs processing of recognizing the page number of each received image data corresponding to each page. The processor 400 determines whether there is image data for which page recognition has not been processed (ACT 24). When it is determined that there is image data for which page recognition has not been processed (ACT 24), the processor 400 reads that image data and performs the page recognition on the read image data (ACT 25).

That is, the processor 400 performs page recognition processing of recognizing the page number indicated in each image decolored by the OCR processing. The page recognition processing is executed by the processor 400 executing the recognition program 405b. For example, the processor 400 loads the image data to be processed into the RAM 402. The processor 400 extracts an image area of characters that seems to be a page number from an area where there is a possibility that a page number such as an upper end portion or a lower end portion of an image may exist. When extracting an image area including characters like a page number, the processor 400 recognizes the page number by performing character recognition on the extracted area.

When recognizing the page number, the processor 400 saves the page number obtained as the recognition processing result as a record associated with the image data (image file) (ACT 26). For example, the processor 400 generates a management table in which a record in which a page number as a recognition result is associated with an image file corresponding to one page is collected for each series of processing.

Figure 8:
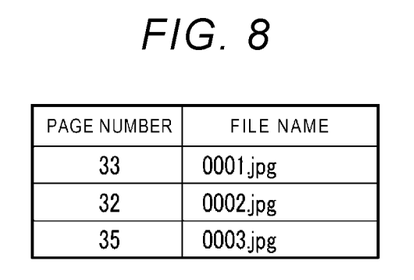
FIG. 8 is a diagram showing an example of management information for images read by the decoloring device according to the embodiment before decoloring.

FIG. 8 shows an example of the management table including the recognition results of the page numbers. In the management table shown in FIG. 8, recognition results (which are page numbers in this example) and file names are additionally written as records in order of recognition processing. When recognizing the page numbers for three image files in order of "0001.jpg", "0002.jpg", and "0003.jpg", the processor 400 generates the management table shown in FIG. 8, for example.

The processor 400 executes the processing of the ACTs 25 and 26 on all the image data received from the decoloring device 100 and stored in the auxiliary storage device 405. As a result, the processor 400 may acquire the page numbers for all the images decolored by the decoloring device 100. The processor 400 may recognize the page numbers and identify which document each image belongs to. For example, the processor 400 classifies each image into a plurality of documents based on the position where a page number exists, the typeface of the page number, or the like. When each image is classified for each document, the processor 400 may generate management information for each document. However, in the present embodiment, it is assumed and described that one sheet of a plurality of pages that make up one document is decolored by the decoloring device 100 regardless of a page order.

Figure 9:
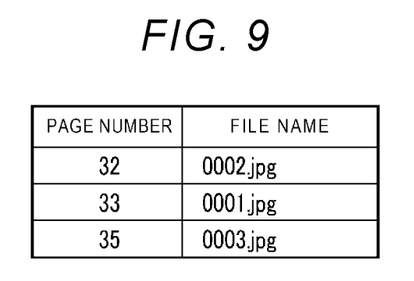
FIG. 9 is a diagram showing an example of the management information after aligning the management information shown in FIG. 8.

When the page numbers of all the decolored images are recognized, the processor 400 performs processing of arranging each image based on the order of the page numbers (ACT 27). For example, the processor 400 reads the generated management table in such a manner that a record is additionally written in the processing order and reconstructs the management table in which each image is rearranged in the order of the page numbers. The order may be an ascending order or a descending order of the page numbers. In addition, the processor 400 may perform the rearrangement by using a general sorting method such as quick sorting in the sorting processing. For example, FIG. 9 is a diagram showing an example of the management table after the such processing. In the management table shown in FIG. 9, each image file in the management table shown in FIG. 8 is rearranged in an ascending order of the page numbers.

After generating the sorted management table, the processor 400 determines whether to print the sorted images with the printing device 101 (ACT 28). For example, if the sort button 603 is pressed on the operation panel 208 of the decoloring device 100, the processor 400 may print each image in the sorted order. In addition, when the user specifies saving the sorted images, the processor 400 may save the images in the auxiliary storage device 405 together with the management table in which the images are sorted.

When it is determined to print the sorted images (ACT 28, YES), the processor 400 activates the printer driver 405a and performs print setting for the printing device 101 (ACT 29). The printing device 101 performs print setting according to the setting value specified by the processor 400 of the PC 102. The print setting specified by the processor 400 may be an initial setting value or may be a value corresponding to the contents specified by the user on the operation panel 208 of the decoloring device 100. For example, the user may specify printing the sorted images by operation panel 208 of decoloring device 100 or the like by the non-decolorable image forming material. The processor 400 may set the printing with the non-decolorable image forming material when the printing with the non-decolorable image forming material is specified from the decoloring device 100.

When the print setting is completed, the processor 400 reads the management table in which the images to be printed are sorted (ACT 30). The processor 400 prints the images of each record with the printing device 101 in the order set by the management table (ACT 31). That is, the processor 400 generates printing data in which each image is arranged in the order set in the management table and transmits the generated printing data to the printing device 101. The printing device 101 prints the printing data supplied from the PC 102 according to the print setting. For example, when printing with the non-decolorable image forming material is set, the printing device 101 executes printing based on the printing data using the printer 101b.

When ending the printing by the printing device 101, the processor 400 determines whether to delete the printed images (ACT 32). For example, the user may specify whether or not to delete the printed images with the operation panel 208 of the decoloring device 100 or the like. In addition, the images after printing may be deleted as an initial setting, and unless otherwise specified by the user, the images after printing may be deleted. If it is determined that the printed image is to be deleted (ACT 32, YES), the processor 400 deletes the printed images and the management table of those images and ends the series of processing. In addition, if it is determined that the printed image is not to be deleted (ACT 32, NO), the processor 400 ends the processing while saving each image and the management table after the alignment processing.

Part or all of the processing shown in FIG. 7 may be performed by the decoloring device 100. The decoloring device 100 has a configuration such as a processor 300, a ROM 301, a RAM 302, an auxiliary storage device 305, and the like. Therefore, the decoloring device 100 may perform each processing shown in FIG. 7. In addition, part or all of the processing shown in FIG. 7 may be performed by the printing device 101. For example, if the printing device 101 is configured to have a processor and various memories, the printing device 101 may perform each processing shown in FIG. 7.

As described above, according to the present embodiment, even when a plurality of sheets of paper printed with an image to which a page number is allocated are set in a decoloring device in any page order, images read from the sheet before decoloring may be arranged according to the page order. In addition, in the present embodiment, by printing the images according to the page order, printed document having pages arranged in the page order can be obtained from a plurality of sheets of paper arranged in any page order.

In addition, according to the embodiment, it is also possible to obtain images printed in page order as a document printed with the non-decolorable image forming material. For example, in the present embodiment, if a plurality of sheets of paper on which an image is printed with a decolorable image forming material are stacked in a decoloring device in any page order, a printing device may output a document printed with the non-decolorable image forming material arranged according to the page order.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A decoloring device comprising:
a scanner configured to read an image on a sheet;
a decoloring unit configured to decolor the image on the sheet after the scanner has read the image; and
a processor configured to recognize a page number included in the image, and store the image read by the scanner and decolored by the decoloring unit at a location that is associated with the recognized page number.

2. The device according to claim 1, further comprising:
a storage device in which the image is stored,
wherein the processor is configured to maintain a data structure that associates the page number with the location of the image in the storage device.

3. The device according to claim 2, wherein
as images of multiple sheets are read by the scanner and decolored by the decoloring unit, the processor recognizes a page number included in each image, stores each image read by the scanner and decolored by the decoloring unit at an available location in the storage device, and updates the data structure to associate the recognized page number of each image to the location of the corresponding image in the storage device.

4. The device according to claim 3, wherein
upon receiving an instruction to output the images according to an order of the page numbers, the processor reads the data structure and outputs the images in the order of the page numbers associated therewith in the data structure.

5. The device according to claim 4, wherein the images are output to a printer in the order of the page numbers associated therewith in the data structure.

6. The device according to claim 3, wherein the images are saved in the storage device along with the data structure.

7. An image processing system comprising:
a printer; and
a decoloring device including
  a scanner configured to read an image on a sheet;
  a decoloring unit configured to decolor the image on the sheet after the scanner has read the image; and
  a processor configured to recognize a page number included in the image, and store the image read by the scanner and decolored by the decoloring unit at a location that is associated with the recognized page number,
wherein, upon receipt of an instruction to print the image, the processor output the image to the printer, and the printer prints the image.

8. The system according to claim 7, further comprising:
a storage device in which the image is stored,
wherein the processor is configured to maintain a data structure that associates the page number with the location of the image in the storage device.

9. The system according to claim 8, wherein
as images of multiple sheets are read by the scanner and decolored by the decoloring unit, the processor recognizes a page number included in each image, stores each image read by the scanner and decolored by the decoloring unit at an available location in the storage device, and updates the data structure to associate the recognized page number of each image to the location of the corresponding image in the storage device.

10. The system according to claim 9, wherein
upon receiving an instruction to print the images according to an order of the page numbers, the processor reads the data structure and outputs the images in the order of the page numbers associated therewith in the data structure to the printer, and the printer prints the images in the order of the page numbers associated therewith in the data structure.

11. The system according to claim 10, wherein the printer prints the images using non-decolorable ink.

12. The system according to claim 10, wherein the printer prints the images using decolorable ink.

13. The system according to claim 9, wherein the images are saved in the storage device along with the data structure.

14. A method of printing a document having a plurality of pages printed with decolorable ink, in non-decolorable ink, said method comprising:
stacking the plurality of pages printed with decolorable ink;
scanning each of the plurality of pages and reading an image formed thereon;
after scanning each page, decoloring the page and performing character recognition of the image to determine a page number included in the image; and
printing the images in non-decolorable ink according to an order of the page numbers included in the images.

15. The method according to claim 14, further comprising:
storing the images in a storage device; and
maintaining a data structure that associates a storage location for each image in the storage device with the page number included in that image.

16. The method according to claim 14, wherein the plurality of pages are not stacked in the order of page numbers included in the pages.

* * * * *